United States Patent
Ricks

[11] Patent Number: 6,042,142
[45] Date of Patent: Mar. 28, 2000

[54] ENCAPSULATION OF HORN SWITCH IN AIRBAG MODULE COVER WITH REINFORCING MATERIALS

[75] Inventor: Merle K. Ricks, Layton, Utah

[73] Assignee: Autoliv ASP, Inc., Ogden, Utah

[21] Appl. No.: 09/075,090

[22] Filed: May 8, 1998

[51] Int. Cl.[7] ................................................ B60R 21/16
[52] U.S. Cl. ........................................ 280/731; 200/61.54
[58] Field of Search ......................... 280/728.3, 731, 280/728.2; 200/61.54, 61.55

[56] References Cited

U.S. PATENT DOCUMENTS

| | | | |
|---|---|---|---|
| 4,325,568 | 4/1982 | Clark et al. ............................. | 280/731 |
| 4,878,689 | 11/1989 | Mitzkus et al. ......................... | 280/731 |
| 5,064,217 | 11/1991 | Shiraki ................................. | 280/728.3 |
| 5,186,490 | 2/1993 | Adams et al. ........................... | 280/731 |
| 5,198,629 | 3/1993 | Hayashi et al. ......................... | 200/61.54 |
| 5,269,559 | 12/1993 | Fillon et al. ............................ | 280/728 |
| 5,369,232 | 11/1994 | Leonelli ................................ | 200/61.54 |
| 5,413,376 | 5/1995 | Filion et al. ............................ | 280/728.3 |
| 5,423,569 | 6/1995 | Reighard et al. ........................ | 280/731 |
| 5,520,412 | 5/1996 | Davis ................................... | 280/728.3 |
| 5,523,532 | 6/1996 | Leonelli et al. ........................ | 200/61.54 |
| 5,539,259 | 7/1996 | Filion et al. ............................ | 307/10.1 |
| 5,575,498 | 11/1996 | Elqadah et al. ......................... | 280/731 |
| 5,585,606 | 12/1996 | Ricks ................................... | 200/61.08 |
| 5,626,358 | 5/1997 | Ricks et al. ............................ | 280/731 |
| 5,684,283 | 11/1997 | Hambleton, Jr. et al. ................. | 200/61.08 |
| 5,727,812 | 3/1998 | Dykstra et al. ......................... | 280/731 |
| 5,947,512 | 9/1999 | Magoteaux et al. .................... | 280/731 |

*Primary Examiner*—Paul N. Dickson
*Attorney, Agent, or Firm*—Ohlandt, Greeley, Ruggiero & Perle, LLP; George W. Rauchfuss, Jr.

[57] ABSTRACT

This invention relates to a horn switch which is encapsulated in an airbag module cover by use of a reinforcing fabric attached to the horn switch. The encapsulation results in a firm retention of the horn switch when the airbag inflates, enhances actuation and feel when the horn switch is pressed by the driver, and simplifies manufacturing of the airbag module cover and horn switch assembly.

14 Claims, 5 Drawing Sheets

ENCAPSULATION OF HORN SWITCH IN AIRBAG MODULE COVER WITH REINFORCING MATERIALS

TECHNICAL FIELD

This invention relates to motor vehicle airbag covers and horn switch assemblies. More specifically, it relates to restraining a horn switch in an airbag module cover by encapsulating the horn switch in the airbag module cover.

BACKGROUND ART

Conventional driver's side airbag modules are mounted inside a motor vehicle's steering column. This is typically where the horn switch is located, and therefore the airbag module cover also serves as the area to actuate the horn. There are numerous horn switches which can be used in an airbag module cover such as variable resistors, piezoelectric devices and membrane horn switches as disclosed in U.S. Pat. Nos. 5,269,559; 5,157,372; 5,539,259; 5,369,232; 5,413,376; 5,520,412 and 5,575,498.

One horn switch that can be used is a force sensitive variable resistor switch, which changes its resistance when pressure is exerted on the switch. The change of resistance varies the resistors output voltage. Another switch is a piezoelectric device which transforms mechanical pressure exerted on it into an output voltage that is transmitted to an external horn circuit. A further switch is a membrane horn switch which conventionally comprises two thin conductive sheets which are separated by thin, small insulated spacers. Pressure on the switch causes the conductive surfaces to contact each other and close a circuit to actuate a car horn.

Multiple horn switches have also been assembled with the airbag module cover to increase the horn actuation area. Multiple horn switches are connected via a bridge member which serves as both as an electrical connection and a rupture area when the airbag is deployed, as disclosed in U.S. Pat. Nos. 5,585,606 and 5,684,283.

Coupling the horn switch to the airbag module cover is complicated and causes a number of problems. For example, when a horn switch is mounted on the back of an airbag cover, a significant amount of pressure is required on the air bag cover to actuate the horn switch. This can be dangerous in an emergency situation when horn actuation is quickly desired. Also, when a horn switch is inserted into a pocket of the airbag module cover, the switch may become detached from the airbag module cover upon inflation of the airbag and injure the driver because the horn switch can be ejected from the airbag module cover. Furthermore, the mounting of the horn switch to the back of the airbag module cover requires a significant amount of manufacturing time.

Therefore, it would be useful to provide an airbag module cover incorporating a horn switch that does not require an unreasonable amount of pressure to activate the horn, is not susceptible to becoming detached from the airbag module cover upon inflation of the airbag, and results in ease of manufacturing.

SUMMARY OF THE INVENTION

An object of the invention is to prevent or reduce the probability of a horn switch from becoming detached from the airbag module cover in order to prevent injury to the driver during inflation of the airbag.

A further object of the invention is to provide an airbag module cover coupled with a horn switch so that it only requires a reasonable amount of pressure by the driver to activate the horn.

An additional object of the present invention is to simplify the attachment of the horn switch to the airbag module cover.

In carrying out the objects of the present invention, an airbag module cover is provided wherein the horn switch is attached to a suitable reinforcing material and both the horn switch and the reinforcing material are encapsulated in a molded airbag module cover. By incorporating the horn switch in the airbag module cover, the switch can be positioned closer to the airbag surface cover and easier actuation by the driver results. Also, by attaching the horn switch to the reinforcing material, the reinforcing material restrains the horn switch from being ejected during airbag deployment. Finally, the horn switch and reinforcing material can easily be attached and molded into the airbag module cover greatly simplifying the airbag module cover/horn switch assembly.

The present invention involves an airbag module cover wherein the airbag module cover has a front outer surface facing the driver and an opposing rear inner surface which faces and overlays an inflatable airbag. Encapsulated in the airbag module cover is a horn switch and a reinforcing material wherein the horn switch can be readily actuated when the driver presses against the front outer surface of the airbag module cover. The horn switch, attached to the reinforcing material, is encapsulated by suitably placing it in a mold and molding the airbag module cover around it. Electrical connections from the horn switch protrude from the airbag module cover in order to be connected to an external horn circuit. The airbag module cover encapsulating material can be any type of moldable cover material such as various thermoplastic materials. Preferably, a low temperature (200–250° F.), low pressure moldable material, such as polyurethane, utilizing, the known reaction-in-mold (RIM) process is used as the encapsulating material so as to not damage the horn switch.

The reinforcement material is a fabric material which is attached to the horn switch to protect the horn switch during the molding process and to withstand the force of the airbag when it inflates thereby preventing the horn switch from being detached and becoming a flying object. Some airbag module cover materials alone are not structurally strong enough to withstand an airbag deployment and the reinforcing fabric also strengthens the cover for airbag deployment as well as acting to retain the horn switch during airbag deployment. The reinforcement material should have a melting point significantly higher than the molding temperature of the airbag module cover material. The reinforcement materials can be totally encapsulated by the airbag material, or a portion of the reinforcement material can protrude from the airbag module cover such that the reinforcement material can be anchored to adjacent support structure exterior to the airbag module cover.

The attachment of the horn switch to the reinforcement material can be accomplished by any suitable method, including but not limited to, beat staking, adhesives, tape, staples, sewing, rivets, fasteners and the like.

The horn switch and reinforcement material can be placed anywhere suitable within the airbag module cover depending on the sensitivity of actuating the horn that is desired. If less pressure is desired to activate the horn, the horn switch can be positioned near the front outer surface of the airbag module cover. If more pressure is desired so that the horn will not be easily inadvertently activated, or so the front of the airbag cover will not be marred by the horn switch, the horn switch can be placed near the rear inner surface of the airbag module cover. The sensitivity of actuation can also be varied by positioning the horn switch on the reinforcing material so that the horn switch is either facing towards the front outer surface of the airbag module cover for increased sensitivity, or facing towards the rear inner surface of the airbag module cover for reduced sensitivity. It will be appreciated that the horn actuation sensitivity will also be variable depending on the material employed for the cover.

The airbag module cover will generally be provided with tear seams which are weakened areas of the airbag module cover that rupture during deployment of the airbag. In addition, in order to increase the horn activation area, multiple horn sections can be encapsulated within the airbag module cover. Each horn section has a relatively small bridging area that connects to another horn section and aligns with the tear seams in the airbag module cover. The bridge area acts as both an electrical connection between the horn sections so only one electrical connection to the external horn circuit is required, and a weakened area that is designed to readily rupture as the airbag is deployed.

BRIEF DESCRIPTION OF THE DRAWINGS

Reference now is made to the accompanying drawings of illustrative embodiments of the invention in which.

DESCRIPTION OF THE PREFERRED EMBODIMENT

Figure 1:
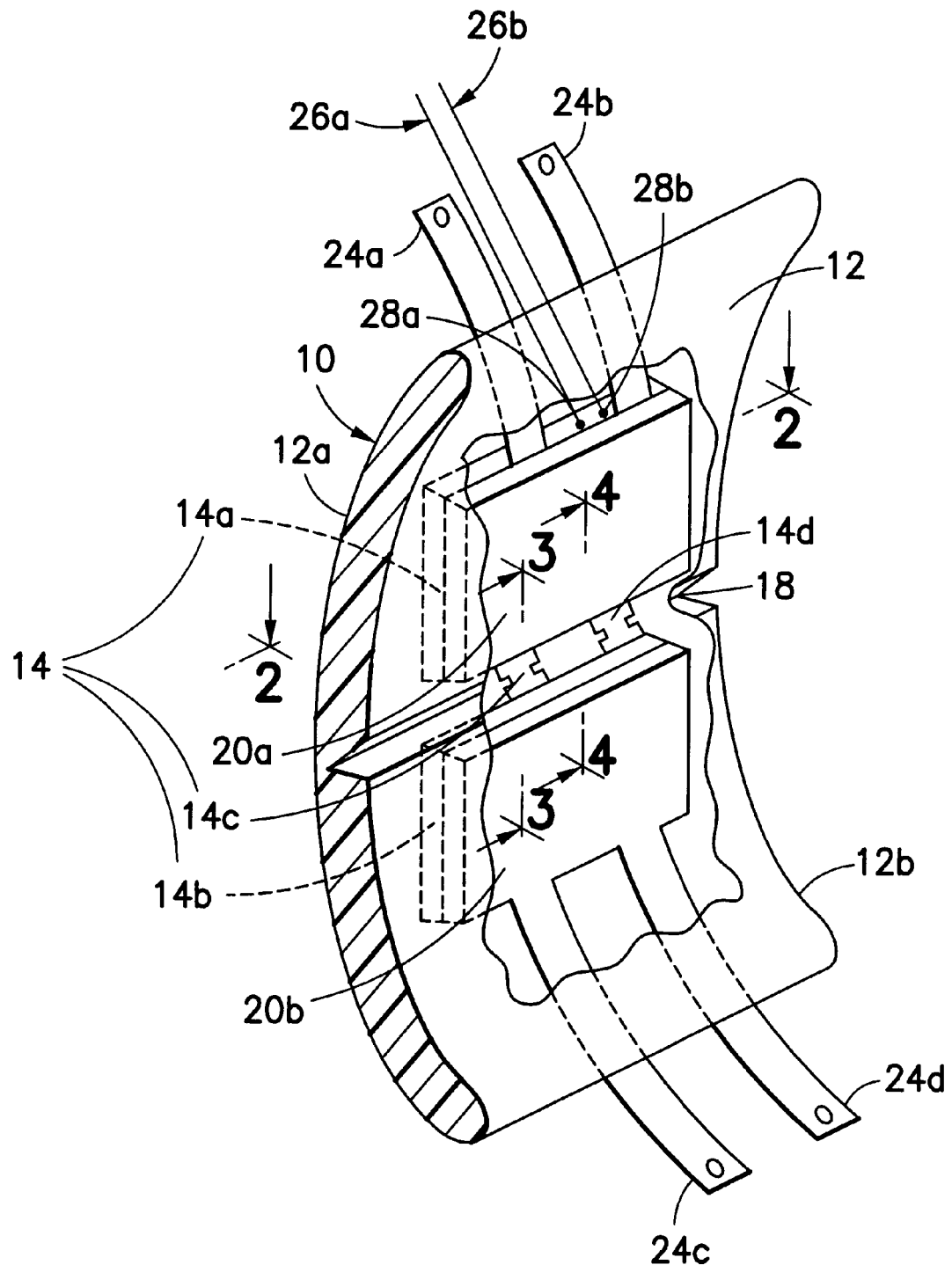
FIG. 1 is a rear perspective and partially segmented view of an airbag module cover with the encapsulated horn switch and reinforcement fabric material shown.

An driver's side airbag module cover encapsulating a horn switch and reinforcement fabric assembly is illustrated in FIGS. 1 to 4. The airbag module cover with the encapsulated horn switch and reinforcement fabric assembly is generally indicated by reference numeral 10 and comprises a horn switch 14 and reinforcing material 20a and 20b encapsulated in an airbag module cover 12. The airbag module cover 12 has a front outer surface 12a and a rear inner surface 12b. Airbag module cover 12 also has a tear seam or weakened area 18. Upon deployment of the airbag, the force of the inflating airbag will rupture the airbag module cover 12 along tear seam 18.

Horn switch 14 comprises two sections, namely a first horn section 14a and a second horn section 14b. Each horn section 14a and 14b is generally a planar, rectangular-shaped variable resistor. It will be appreciated that although the invention is described with a variable resistor switch, other types of horn switches may be used such as membrane or piezoelectric switches. Horn sections 14a and 14b are joined together by two relatively small electrically conductive bridging areas 14c and 14d bridging between the horn sections 14a and 14b. The bridging areas 14c and 14d are generally of the same thickness and of the same material as the large areas 14a and 14b. The invention contemplates that there may be one, or more than one such small bridging area between the two sections. Additional bridging areas provide for increased reliability of the horn switch in the event of inadvertent breakage or rupture of one of the bridging areas. In fact, bridging areas 14c and 14d form integral, one piece horn switch 14 with horn sections 14a and 14b. In other words, the two horn sections 14a and 14b are assembled into the horn switch 14 by joining the two horn sections 14a and 14b with bridging areas 14c and 14d. The relatively small bridging areas 14c and 14d provide readily rupturable areas for rupture by a force produced by an inflating airbag as will be described hereinafter.

Figure 2:
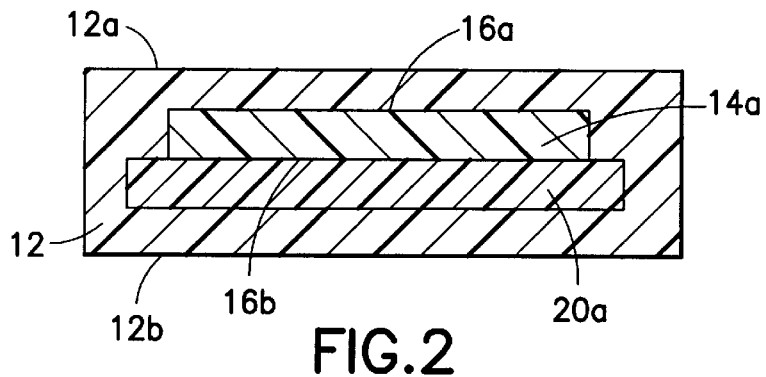
FIG. 2 is a cross-sectional view of the air bag cover along the line 2—2 of FIG. 1.
Figure 2A:
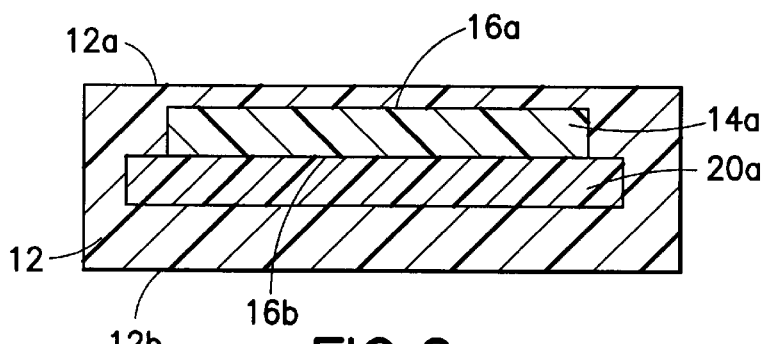
FIG. 2a is a cross-sectional view of the air bag cover similar to FIG. 2 disclosing an embodiment in which the horn switch/reinforcing fabric assembly is closer to the front outer surface of the air bag cover.
Figure 2B:
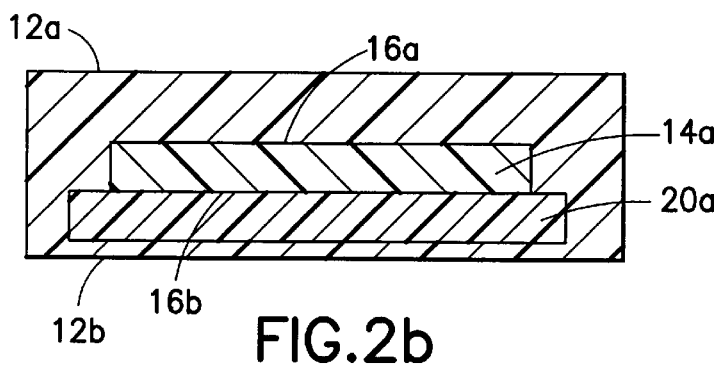
FIG. 2b is a cross-sectional view of the air bag cover similar to FIG. 2 disclosing an embodiment in which the horn switch/reinforcing fabric assembly is closer to the rear inner surface of the air bag cover.
Figure 2C:
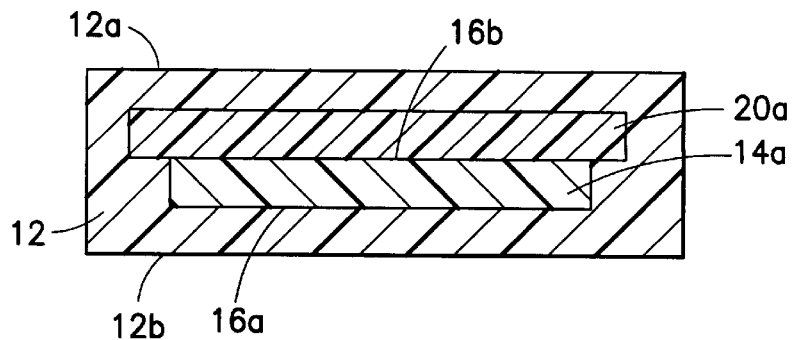
FIG. 2c is a cross-sectional view of the air bag cover similar to FIG. 2 disclosing an embodiment in which the horn switch front surface is facing the rear inner surface of the air bag cover.
Figure 3:
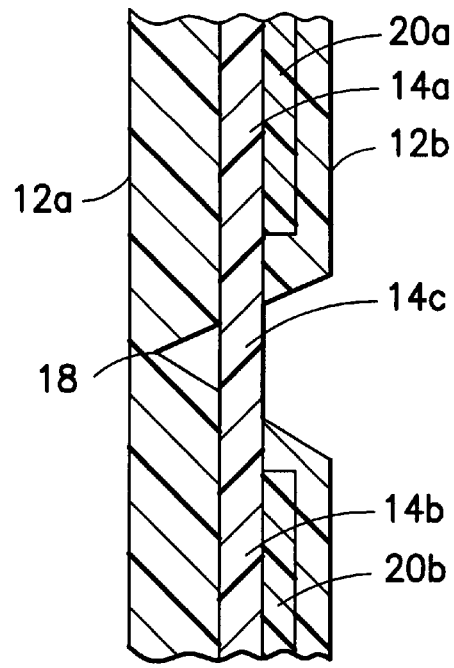
FIG. 3 is a cross sectional view of the airbag module cover along the line of 3—3 of FIG. 1.
Figure 4:
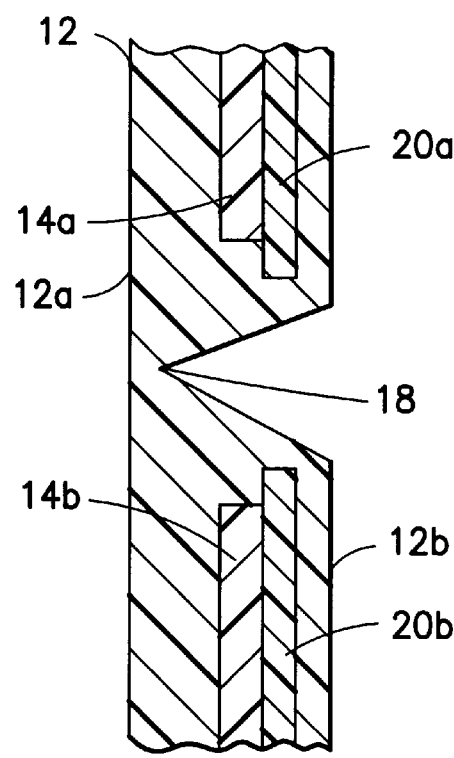
FIG. 4 is a cross sectional view of the airbag module cover along the line of 4—4 of FIG. 1.
Figure 5:
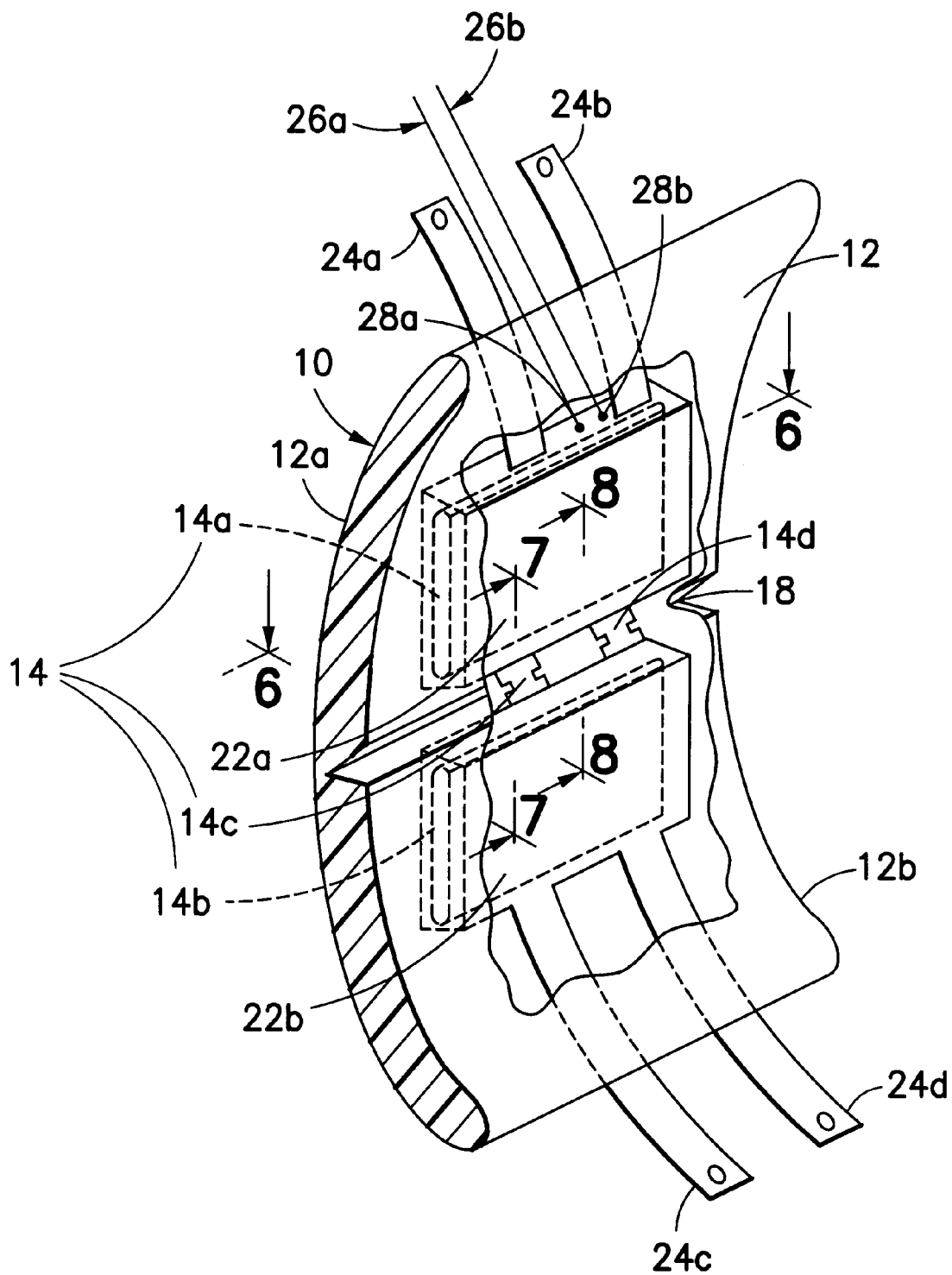
FIG. 5 is a rear perspective and partially segmented view of an airbag module cover with the encapsulated horn switch and reinforcement fabric material shown wherein the horn switch is enclosed by the fabric material inside a fabric pocket.
Figure 6:
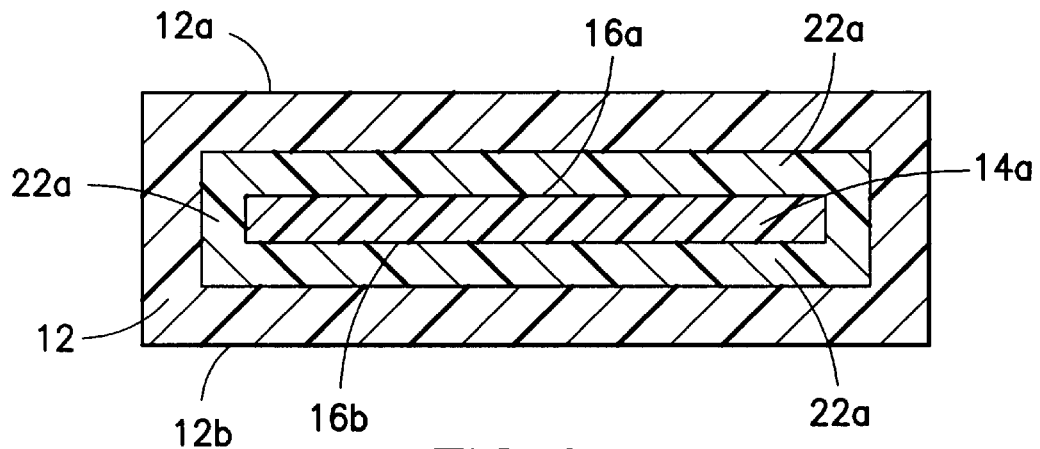
FIG. 6 is a cross-sectional view of the air bag cover along the line 6—6 of FIG. 5.
Figure 7:
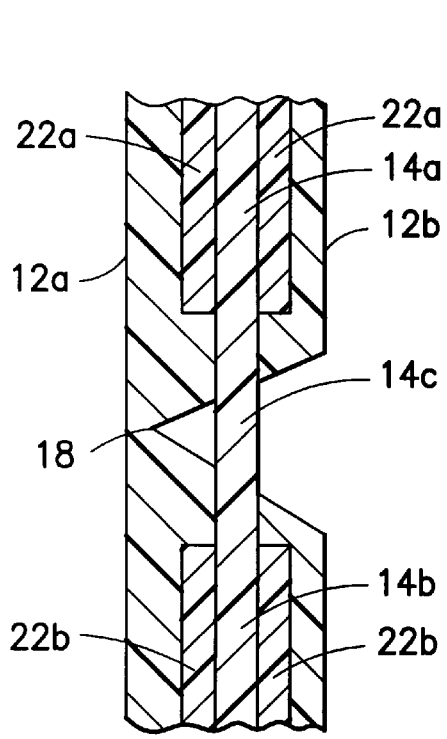
FIG. 7 is a cross sectional view of the airbag module cover along the line of 7—7 of FIG. 5.
Figure 8:
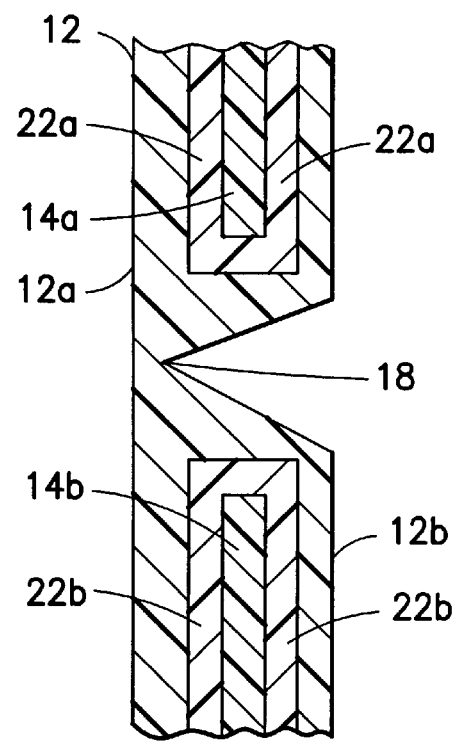
FIG. 8 is a cross sectional view of the airbag module cover along the line of 8—8 of FIG. 5.

Reinforcing fabric 20a and 20b may be employed to the rear of the horn sections 14a and 14b to provide for anchoring support during inflation of the airbag and easier actuation of the assembled horn switch 14. It will be appreciated that reinforcing material 20a and 20b can also be employed to the front side of the horn sections 14a and 14b facing the front outer surface 12a of airbag cover 12, as disclosed in FIG. 2c, depending on the sensitivity of the actuation desired. Furthermore, the reinforcing material 20a and 20b and horn switch 14 can either be place nearer to the front outer surface 12a, as disclosed in FIG. 2a, or nearer the rear inner surface 12b, as disclosed in FIG. 2b, of the airbag cover 12 as desired. In the preferred embodiment, the reinforcing material 20a and 20b will protrude out of the air bag cover 12 so that the protruding portions 24a, 24b, 24c and 24d can be secured to an external support area (not shown) by any suitable means. The reinforcing material 20a and 20b is preferably made of thermoplastics fabric material such as nylon, polyethylene or Kevlar, (an aromatic polyamide fiber), and the like which can be woven in a fabric like material and attached to the sections 14a and 14b by heat staking, sewing, adhesives, tape, staples, rivets or fasteners and the like.

FIGS. 5 through 8 disclose another embodiment of the present invention. The numbered elements in FIGS. 5 through 8 that are common to FIGS. 1 through 4 represent the same elements. The reinforcing fabric material may be used wherein the horn sections 14a and 14b are completely enclosed by the fabric materials 22a and 22b into a fabric pocket and the fabric material 22a and 22b are sewn, stapled, glued, riveted, or fastened closed such that the horn switch 14 can not be ejected from the closed fabric materials 22a and 22b when the airbag is inflated.

The assembled horn switch 14, with rigid reinforcing materials 20a and 20b, is encapsulated in the airbag cover 12 in a manner such that the bridging areas 14c and 14d of sections 14a and 14b are positioned transversely across the tear seams 18 of the airbag module cover 12.

Horn switch 14 has electrical wires 26a and 26b and terminals 28a and 28b for coupling the horn switch 14 to electrical circuitry utilized to actuate a horn. Depression of the airbag module cover 12 by the driver will readily compress horn switch 14 causing actuation of the horn switch 14 and sounding a horn.

Should a situation arise commencing deployment of an airbag, the pressure of the inflating airbag will readily force membrane bridge areas 14c and 14d to rupture and the airbag to then rupture tear seam 18 of the airbag module cover 12 causing the cover to open permitting deployment of the airbag. The thinness and smallness of the bridge areas 14c and 14d, when aligned with the rupturable tear seam 18 of the airbag module cover 12, allows these bridge areas to readily rupture during deployment of an inflatable airbag in an airbag module.

The airbag module cover 12 with encapsulated horn switch 14 and reinforcing fabric 20 of this invention is readily produced by any suitable process. For example, a horn switch 14 can be sewn to an aromatic polyamide fiber reinforcing fabric 20 to non-rupturably attach the horn switch 14 to the reinforcing fabric 20. The reinforcing fabric 20 with horn switch 14 attached is then suitably placed and anchored in an airbag cover mold; the mold closed and suitable airbag cover material introduced into the mold to mold an airbag module cover around the horn switch/reinforcing fabric subassembly to encapsulate the subassembly in the molded airbag module cover. Preferably, the molding process employed is a reaction-in-mold (RIM) process for producing a molded polyurethane airbag module cover.

It is believed that the many advantages of this invention will now be apparent to those skilled in the art and that a number of variations and modifications may be made therein without departing from its spirit and scope.

What is claimed is:

1. A driver's side airbag module cover, said cover comprising:
    a front outer surface and an opposing rear inner surface;
    a horn switch wherein said horn switch has a front surface and a rear surface;
    said horn switch enclosed in a pocket of a reinforcing fabric; and
    said horn switch and reinforcing fabric encapsulated in said airbag module cover between said front outer surface and said rear inner surface of the airbag module cover.

2. The airbag module cover of claim 1 wherein the reinforcing fabric is a thermoplastic.

3. The airbag module cover of claim 1 wherein a portion of the reinforcement fabric protrudes out an edge of the airbag module cover.

4. The airbag module cover of claim 1 wherein said airbag module cover has at least one tear seam.

5. The airbag module cover of claim 4 wherein said horn switch comprises multiple horn sections; each horn section connected to another horn section by at least one bridging area and wherein each of the at least one bridging area is positioned transversely across the at least one tear seam in the airbag module cover.

6. The airbag module cover of claim 1 wherein the airbag module cover is a thermoplastic cover.

7. The airbag cover of claim 6 wherein said airbag cover is a molded, low pressure, low temperature reaction-in-mold polyurethane cover.

8. The airbag module cover of claim 1 wherein said horn switch is a variable resistor horn switch, a piezoelectric horn switch or a membrane horn switch.

9. The airbag module cover of claim 1 wherein the reinforcing fabric is attached to the horn switch by stitching, heat staking, sewing, adhesive, tape, staples, rivets or fasteners.

10. The airbag module cover of claim 1 wherein the horn switch is attached to the reinforcement fabric so the front surface of the horn switch is facing the front outer surface of the airbag module cover.

11. The airbag module cover of claim 1 wherein the horn switch is attached to the reinforcing fabric so that the front surface of the horn switch is facing the rear inner surface of the airbag module cover.

12. The airbag module cover of claim 1 wherein the horn switch and reinforcing fabric are closer to the rear inner surface than the front outer surface of the airbag module cover.

13. The airbag module cover of claim 1 wherein the horn switch and reinforcing fabric are closer to the front outer surface than the rear inner surface of the airbag module cover.

14. The airbag module cover of claim 1 wherein the reinforcement fabric is selected from the group consisting of nylon, polyethylene and an aromatic polyamide fiber.

* * * * *